June 7, 1960 F. LJUNGSTROM 2,939,689
ELECTRICAL HEATER FOR TREATING OIL-SHALE AND THE LIKE
Original Filed June 24, 1947 5 Sheets-Sheet 1

INVENTOR.
Fredrik Ljungstrom
BY
his Attorney

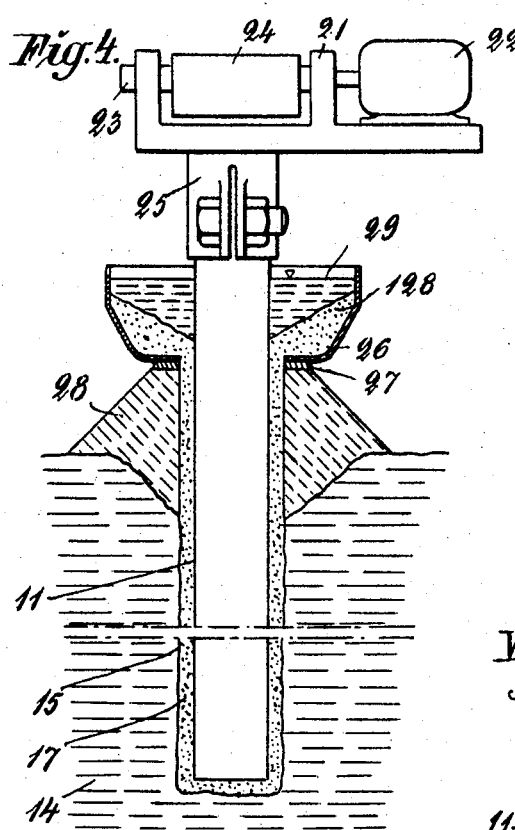
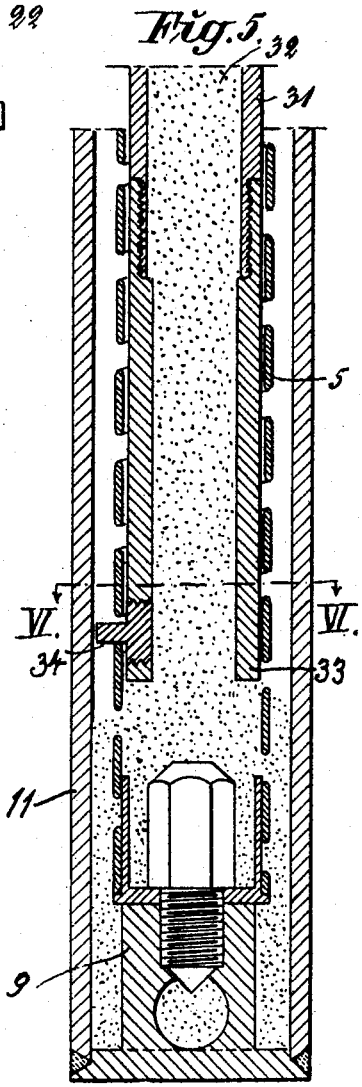
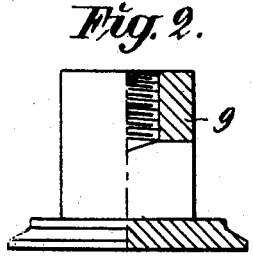
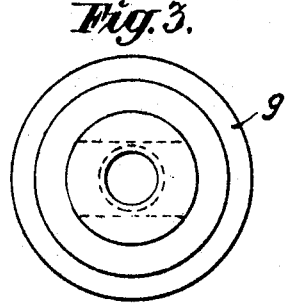

June 7, 1960  F. LJUNGSTROM  2,939,689
ELECTRICAL HEATER FOR TREATING OIL-SHALE AND THE LIKE
Original Filed June 24, 1947  5 Sheets-Sheet 3
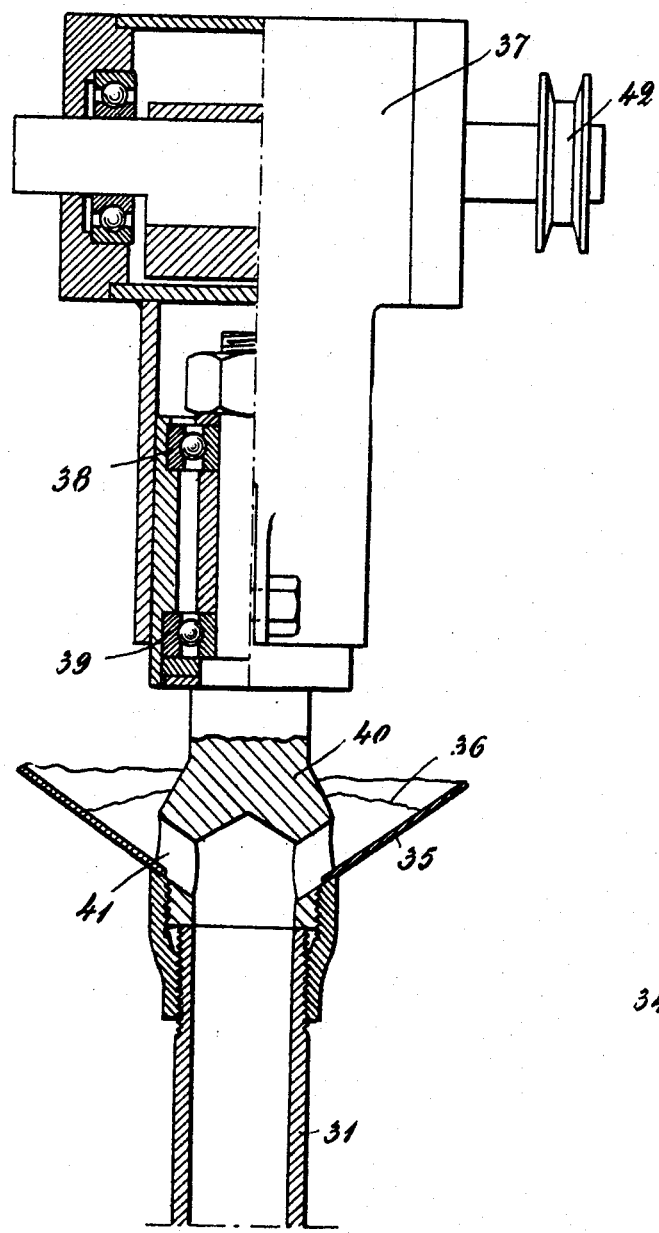
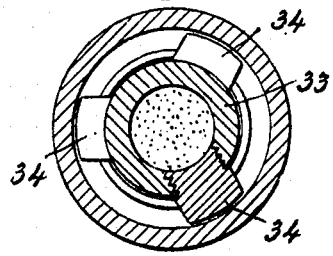

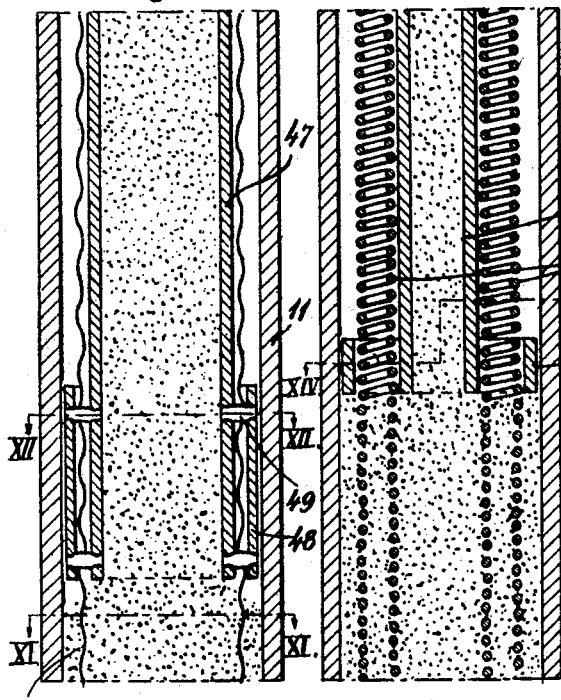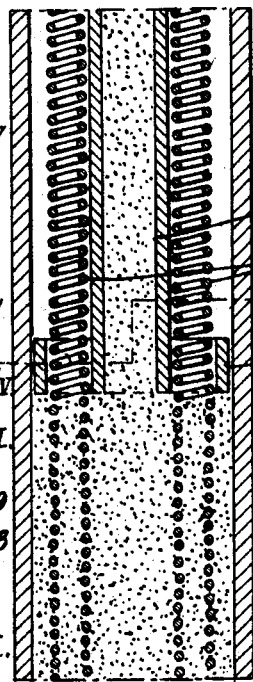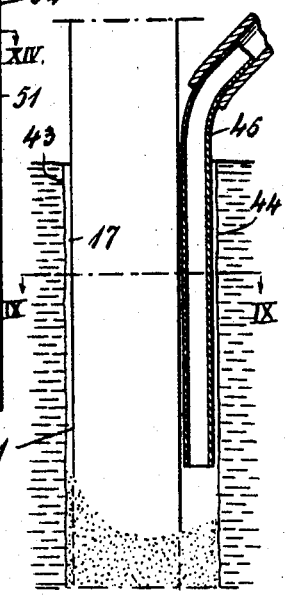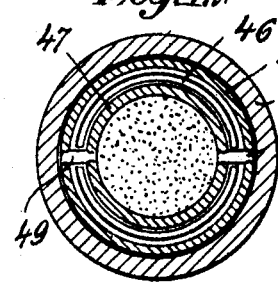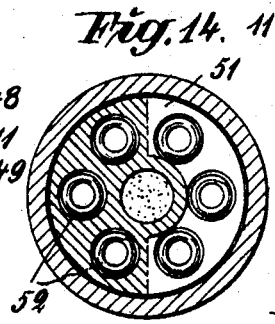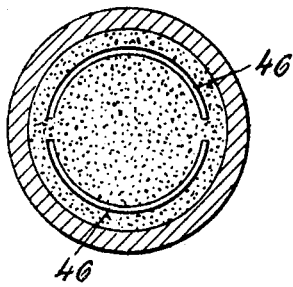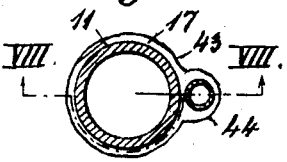

June 7, 1960  F. LJUNGSTROM  2,939,689
ELECTRICAL HEATER FOR TREATING OIL-SHALE AND THE LIKE
Original Filed June 24, 1947  5 Sheets-Sheet 5

INVENTOR.
Fredrik Ljungstrom
BY Sol Shappirio

United States Patent Office 2,939,689
Patented June 7, 1960

1

2,939,689

ELECTRICAL HEATER FOR TREATING OIL-SHALE AND THE LIKE

Fredrik Ljungstrom, Fiskerbackskil, Sweden, assignor, by direct and mesne assignments, of one-half to Svenska Skifferolje Aktiebolaget, Arebro, Sweden, a corporation of Sweden, and one-half to Husky Oil Company, Cody, Wyo., a corporation of Delaware Original application June 24, 1947, Ser. No. 756,624, now Patent No. 2,732,195, dated Jan. 24, 1956. Divided and this application Dec. 18, 1953, Serial No. 399,137

9 Claims. (Cl. 262—3)

This invention relates to the production of mineral oil and other hydrocarbon, etc., products from shales or other hydrocarbon or mineral containing deposits by treatment of the deposits in situ in their natural condition in the ground. More particularly, the invention relates to such production wherein heat is supplied to the shales or other deposit through channels bored down into, or otherwise produced in the shales or other deposit, the products formed under the action of heat being recovered through other channels separated from the first mentioned channels by intermediate portions of the shales.

In the heat treatment of shales or other hydrocarbon or mineral containing deposits, the temperature in the heat supply channels should be considerably higher than the temperature at which the distillation products are produced in order to recover the same within a reasonable time. Such high temperatures have heretofore in prior art recoveries, resulted in an unfavorable effect on the oil or hydrocarbon products obtained insofar as they are carbonized to a substantial extent and converted to incondensable gases.

The present application is a division of my copending application Serial No. 756,624, filed June 24, 1947, now Patent No. 2,732,195 granted Jan. 24, 1956, entitled Method of Treating Oil Shale and Recovery of Oil and Other Mineral Products Therefrom.

Among the objects of the present invention is included the production and recovery of distillation products of higher quality than was heretofore possible in prior art processes.

Further objects include means for ensuring good heat conduction between the heat supply means and the walls of the channels of the shales or other deposits.

Still further objects include means to prevent distillation products extracted in the zones of the deposits, which products are at approximately distillation temperatures, from flowing toward the hot zone adjacent the said channel.

Still further objects and advantages of the present invention will appear from the more detailed description given below by way of explanation and illustration, but without limitation thereto, since various changes therein may be made by those skilled in the art without departing from the scope and spirit of the present invention.

In connection with that more detailed description, the drawings show the following:

Fig. 2 shows a detail of the electric heating element, partly in the same section as in Fig. 1.

Fig. 3 is a top view of said detail.

Fig. 4 illustrates a preferred apparatus for building the electric heating element into the shale rock.

Fig. 5 is a longitudinal sectional view of a heating element and of a tubular element for the assembly of the element.

Fig. 6 is a sectional view taken on the line VI—VI of Fig. 5.

Fig. 7 is a partial sectional view of a device or an auxiliary member used in connection with the tubular element shown in Figs. 5 and 6.

Fig. 8 shows a device for loosening the heating element from the rock, the figure being a sectional view taken on the line VIII—VIII of Fig. 9.

Fig. 9 is a sectional view taken on the line IX—IX of Fig. 8.

Fig. 10 is a sectional view of a modification of a heating element, and of a modification of an auxiliary member for the assembly thereof.

Figs. 11 and 12 are sectional views taken on the lines XI—XI and XII—XII of Fig. 10, respectively.

Fig. 13 is a sectional view, similar to that of Fig. 10, of a further modification of the electric heating element, and of a modification of the auxiliary member for the assembly thereof.

Fig. 14 is a sectional view taken on the line XIV—XIV of Fig. 13.

Figure 1:
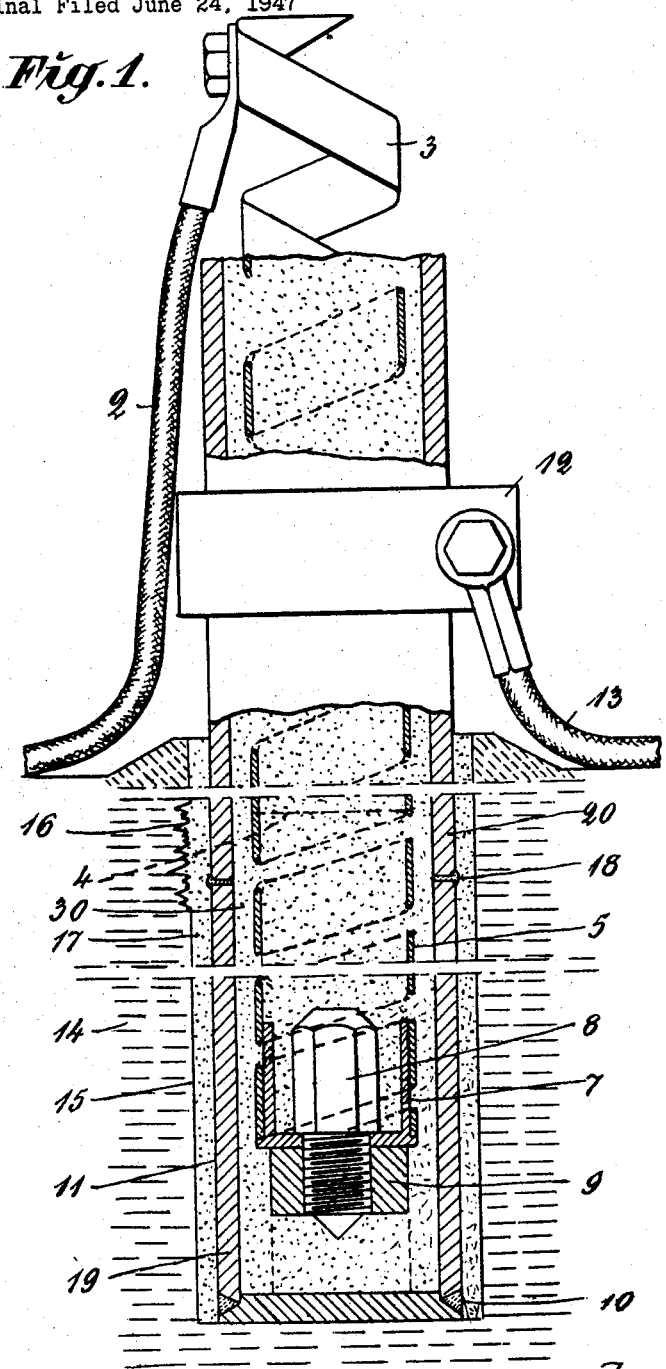
Fig. 1 is a partial longitudinal sectional view taken at right angles through Fig. 5 of an electrical heating element engaging a channel in the shale rock.

In accordance with the present invention, the heating element for recovery of distillation products from shales or other mineral deposits, is adapted to be placed within a channel in said shale or deposit and the space between the channel and the heating element is filled with granular heat conducting material whereby the heat supply may be uniformly controlled over substantial depths or areas in said channel whether or not a casing is present. For these purposes means are also provided to facilitate supply of the granular material and to ensure its most efficient distribution in the channel or casing. Furthermore, heating elements and associated feeding members for the granular material are provided to provide unitary structures for use particularly with associated vibrating mechanism for use during the supply of granular material to insure the desired distribution thereof. Structures may thus be obtained which may be removed as entities from the channel for reuse at other localities. For this purpose means are provided to facilitate removal of the granular material from the channel or casing to release the heating element and any associated mechanism so that they may be readily removed from the channel or casing. The devices also permit novel arrangements of heating elements and of electrical circuits for supplying power to said elements. These and many other features will appear from the description of the structures shown in the drawings.

Referring to the drawings, an electric conductor 2, as shown in Fig. 1, is connected to helically shaped conductor 3, preferably made from ordinary iron. The conductor 3 is welded, as at 4, to electric resistance 5, which is likewise of helical form. The resistance 5 is annularly welded at the lower end thereof to contact sleeve 7, which is adapted to be tightened up against bottom stopper 9 by means of screw 8, said stopper being rigidly connected with tubular resistance casing 11 by means of weld joint 10. In this way, the casing is in electrically conducting connection with resistance coil 5 enclosed thereby. The casing 11 is connected at the top, by means of a clamp 12 and an earth connection 13, with earth connection means (not shown) in a known manner. Now, if a single-phase alternating current is passed through the conductor 2, the member 3, the coil 5, the bottom stopper 9, the resistance casing 11 and the earth connection 13, the coil 5 and preferably also the casing 11 will be heated, the heat thus produced being transmitted to the shale rock 14 surrounding said casing.

The channel or hole 15 bored into the shale rock and having the above described heating element engaging the same, is not of uniform contour by reason of the nature of the rock, said bore hole showing instead rather a ragged contour irregular in its details, as indicated at 16. At the same time, the hole will not be exactly straight and consequently it will not conform with the tubular casing 11 in a close geometrical manner. For this reason, a space 17 is provided to permit the tube 11 to be introduced into the hole 15. The hole 15 is of a depth, which may amount to 20–30 meters, or more, and the electric heating elements become very long and narrow. The casings 11 are composed, therefore, of a number of tubular lengths united by welded joints 18. These joints may be either autogenous gas welds or electric resistance welds, preferably such of the butt weld type. The casings are mounted so that a tubular length 19 of 6 meters, for example, is first introduced into the hole 15, whereupon another tubular length 20 is welded by gas or electrical welding to the tubular length 19, and then to a subsequent third tubular length, and so forth, until the casing is of the desired length in the hole 15. After the casing 11 has been introduced in this manner into the hole 15, the flexible resistance 5, which is integral in its longitudinal direction, is introduced into the casing. The contact sleeve 7 of the resistance is secured to the bottom stopper 9 by means of the screw 8 with the aid of a wrench suitably combined from a plurality of lengths.

The space 17 is filled, according to the invention, with sand or a similar pulverulent substance, such as natural quartz sand or crushed quartz. Shale rock having holes bored therein of a depth required for present purposes results in subsoil water, to a greater or lesser degree, flowing into the bore holes, or, if it is endeavoured to drain off the subsoil water from the rock, there will in any case result moist or wet portions here and there along the longitudinal direction of the hole. In addition, the geologic shale formations often contain small stratifications of clay or other loose substances that have been deposited here and there alternately with the shale during the various periods of development of the shale rock, said periods showing differences in time of millions of years between the origin of the different layers. For this reason there is no homogeneity in the structure of the wall of the hole. At times it will be smeary from clay penetrating into the same, and at times the water will penetrate into the same from the various layers. As a result the sand, if filled into the space 17 in the ordinary manner, may be moist or smeary because of the wet regions in the bore hole or because of the small particles of the hole of the wall built up from clay or the like. The sand is thus likely to clog and fail to fill the space 17 in a satisfactory homogeneous manner.

The invention provides means to eliminate these difficulties, so that the space 17 and all crannies of the same will be entirely filled by a compact layer of sand. To this end, a vibrator 21 (Fig. 4) is applied directly to the pipe 11, said vibrator being in known manner built together with a motor 22 adapted to drive a rotary shaft 23 having a centrifugal weight 24 eccentrically mounted thereon. The apparatus 21 is tightened upon the pipe 11 by means of a clamping device 25. A bowl 26 is tightly fitted to the hole 15 by means of a packing 27 and a cement lining 28. The bowl 26 is filled with water and then with sand 128. The water flows down so as to fill the hole 15, whereupon the sand will sink down slowly through the water so as to displace the latter upwardly by its own weight. The arrangement is in this connection based on the following physical phenomenon.

If sand be moistened or wetted, it permits of being shaped to various forms. By the presence of the water the sand obtains a certain coherence, which depends on the fact that a film of liquid between two sand grains in the very angle between the adjacent sand grains shows a water surface with a very small radius of curvature and a strong capillary effect. The liquid surface tends to expand this radius of curvature, the sand grains being consequently pressed against each other with a certain force. Consequently, sand of a merely moist or wet nature may be packed, for instance, into a cup (compare with a child's play), and by turning this cup upside down, a coherent body of sand of the shape of the cup is obtained, as is well known. On the other hand, sand of this structure cannot flow or be pressed through long holes, nor can it accurately fill a space of the nature of the space 17 (Figs. 1, 4), particularly if clay from the wall of the hole contamintes the sand in addition thereto. If a stick is thrust down into a moist or wet heap of sand, then the stick will leave a hole behind when pulled up. Analogously a number of spaces will be obtained, if it is endeavoured to fill a long and narrow hole with sand, if such filling is possible at all.

According to the invention, the filling of sand takes place beneath the water surface, as will appear from the above. In such case, there is no liquid film between two sand grains bearing on each other, which film would tend to press the grains onto each other. All forces about the sand grains are entirely balanced, and the grains move just as easily relatively to each other as if they were dry. If dry sand is scooped up in a heap on a plane, the lateral surfaces of the heap form a certain angle, the so-called sliding angle, to the horizontal plane, depending on the friction between the sand grains. If the sand is moist, this sliding angle becomes much steeper, and may in certain cases be vertical (for instance the hole after the stick). On the other hand, if the sand is entirely underneath a water surface when being scooped up, the sand heap assumes the shape involved by its sliding angle in the dry state, and consequently becomes movable as far as possible. If in the latter case the sand is subjected to vibration, all sand grains are brought into a vivid movement, from which it follows that all conceivable spaces are filled compactly by said grains of different sizes. The invention takes advantage of the above-mentioned physical conditions in such manner that the tubular casing 11 is subjected to a powerful vibration all over its length by means of the vibrator 21, while the hole 17 is filled with water, whereupon the sand 128 is filled underneath the water surface 29 into the container formed by the bowl 26. The space 17 is thus filled effectively and compactly with sand from below and upwardly, independently of whether there is any subsoil water in the shale rock, and independently of whether the shale rock consists in small areas of thin stratifications of clay adapted to form a sludge in water. Vibration and filling of sand having proceeded for a suitable time, such as one hour, the vibrator 21 and the bowl 26 are removed. The tube 11 is then by means of the sand layer 17 in a compact intimate connection with the shale rock 14, whereby the greatest possible heat conducting capacity has been provided between the tube 11 and the shale rock.

When the electric current is turned on, the electric resistance 5 (Fig. 1) gives off its heat to the surrounding area and thus to the tube 11. Finally, the whole aggregate reaches a temperature lying, for instance, between 500 and 1000° C. Now, a strong external pressure acts upon the casing 11 by reason of the fact that the casing is substantially immovably connected with the wall 15 of the hole through the firm packing of the intermediate sand layer 17, as well as by the fact that the casing 11 tends to expand through the thermal expansion, while being prevented therefrom by the surrounding mass of rock. This pressure on the casing is made still more pronounced by the fact that in the destructive distillation resulting from the heating, the shale rock is deprived of part of its constituents thus becoming porous, so that it will finally sink in the vertical direction to a dimension, which is perhaps smaller than the original one by a few percent or more. The tendency is therefore for the tubular casing 11 to be compressed. It is a further feature of the invention, that the resistance element 5 is fixed with respect to its position relative to the protective casing 11 by the electrically non-conducting pulverulent substance brought down into said casing, e.g. by the quartz sand, or by crushed quartz gravel as explained above. At the same time, this substance serves to reinforce the protecting casing against the above-mentioned external pressure, so that intimate contact is maintained between the same and the outer sand filling 17, despite the prevailing high temperatures.

For the filling of the said substance, the device shown in Figs. 5–7 may be advantageously used in the embodiment according to Fig. 1. A pipe 31 is brought down into the casing 11, said pipe having a diameter somewhat smaller than that of the coil 5, and through which quartz gravel 32 is let down into the casing. The pipe 31 has a guide member 33, which attains a fixed position relative to the longitudinal axis of the resistance unit by means of protuberances (one or more) 34 between the wire convolutions of the resistance 5. The pipe 31 communicates with a filling funnel 35 (Fig. 7), wherein quartz gravel 36 is being filled. The gravel then flows down through a number of apertures 41 in a connecting member 40 into the pipe 31. In order that the body of gravel thus brought into the casing shall be effectively packed together, the pipe 31 is connected, according to the invention, with a vibrator 37, which by means of the two single-row ball bearings 38 and 39 are in rotatable connection with the pipe 31 through the connecting member 40. If the vibrator 37 is now started by means of a rotating pulley 42, which may be driven by an electric motor, the whole unit consisting of the vibrator 37 and the parts 40, 31 and 33, as well as of the mass of gravel 32 flowing into the same, is brought into vibration. Simultaneously with the filling of the gravel 32, the pipe 31 is turned, for instance by being actuated manually, so that the protuberances 34 in the helical space of the coil 5 will be screwed upwardly at a constant filling of gravel. During such screwing movement from below and upwardly, the whole resistance unit is being filled with quartz gravel 32 at a constant vibration, whereby the gravel becomes tightly packed to reinforce the casing 11, while the resistance 5 is held fast in its proper position for the whole of its length from below and upwardly. Furthermore, a maximum of heat transmitting capacity is ensured between this resistance and the surrounding.

The electric resistance 5 has a great extension in the vertical direction, as will be seen from the above. If the resistance were introduced so as to be freely suspended or to be held, for instance, by parts of various constructions supporting the same, such as are made use of in the general construction of electric resistances, then the supporting of the resistance would nevertheless cause serious and, perhaps, insurmountable construction difficulties for the reason that the combined weight of the whole resistance would exert too great stresses on the supporting parts, which are influenced by the high temperature within the resistance, whereby the strength thereof is highly impaired. According to the invention, however, a firm grip is produced about all of the parts of the resistance mutually and relatively to the surrounding mass of rock, so that no portion of the resistance is left without a support, whereby it would be subjected to dangerous deformations, but is at the same time so firmly connected with the surrounding that the dimensional changes in the longitudinal direction of the resistance may take place under adequate conditions, that is to say, without causing any short-circuits or any irregular deformation.

The resistance 5 may be made from a chromium-iron alloy holding a high percentage of chromium. Such a material is rather expensive and should, therefore, be utilized as long as possible. Accordingly, after the surrounding mass of rock has reached the desired temperature, the electric resistance 5 may be removed from the casing 11, in order to be used again in another protecting casing and another hole in the rock. To this end, a pipe is introduced within the resistance 5, the pipe being thrust down vertically and communicates with air of a high pressure, the sand being then blown up out of the casing 11. After that, the screw 8 is loosened by means of the above-named coupled wrench, whereupon the resistance 5 may be pulled up from the casing 11 to be again screwed fast within another resistance casing.

It is also possible to remove the resistance unit in its entirety from the rock. Inasmuch as the sand 17 keeps the pipe 11 immovably rigid in the rock, this cannot take place, as long as such sand is packed about the unit. According to Figs. 8 and 9, the hole 43 provided in the shales may therefore be provided with a channel shaped enlargement 44, wherein a blow-out pipe 45 may be brought down. Hereby, the sand may be blown up from the space 17 by means of compressed air, so that the pipe 11 is released and may be pulled up from the hole 43. In this manner, the whole resistance element may thus be brought into use a plurality of consecutive times for various heating periods, while a rigid connection between the same and the surrounding rock as well as a heat transfer to the latter as effective as possible are ensured at the same time.

In the form of embodiment shown in Figs. 10–12, the resistance is made in two arcuate sections 46. The sand packing member 47 is centered in the casing 11 by means of a sleeve 48, which is connected to this member by rivets 49. The arcuate resistance elements are received between the sand packing member 47 and the centering sleeve 48. The filling of quartz gravel is effected in the same manner as that above described, save for the fact that the filling members need not be rotated here, but may be pulled straight upwardly during the filling operation.

A further modification of the resistance elements is shown in Figs. 13 and 14. A filling member 50 embraces, by means of a crown 51 provided, for instance, with six holes, the same number of resistance coils 52, which are thus kept in position in the above-described manner during the filling of the quartz gravel, while the member 50 mediates the filling and the packing of the quartz gravel at vibration.

In the assembly of the electric resistances, it is of importance that a live part is not brought too near another part of a lower or higher tension at any individual point within the whole resistance unit. A certain minimum distance, with a so-called creeping length involved thereby, is required, therefore, to create safety against rupturing of the electric current. Should, for instance, any part of the resistance coil or resistance element become deformed by carelessness when brought down into the protecting casing, it is conceivable that in spite of the guide members above described, said coil or element might nevertheless at some point come too near a portion of a different electric tension by said deformation. To prevent such an event, the pulverulent filling material is crushed, according to the invention, if consisting of crushed material, or sifted, if consisting, for instance, of natural quartz sand, to such grain sizes that a great number of grains within the material in question are of a size such that a single grain lying between two parts having a relative tension therebetween is sufficient to keep these two parts at a safe creeping distance from each other. These larger grains are present in so great a number within the pulverulent material that the chances are very great that no surface of the resistance material shall be permitted to come into a closer contact with the corresponding surface than the size of those larger grains. For example, if the resistance unit has an intermediate space between the resistance casing and the resistance element, which is all over 3 mm. at least, a greatest grain size would be selected, which may be sifted through a sieve having intermediate spaces of 2 mm. For example, if 10% of the resistance material consist of such 2 mm. grains, these occur mixed in such a quantity with the finer grain sizes that a minimum play of at least 2 mm. is ensured all over, while the smaller grain sizes permit at the same time the filling of the spaces and, although they do not contribute directly to the electric insulation, participate nevertheless very effectively to provide for the heat transfer between the electric resistance and the surrounding protecting casing.

Figure 15:
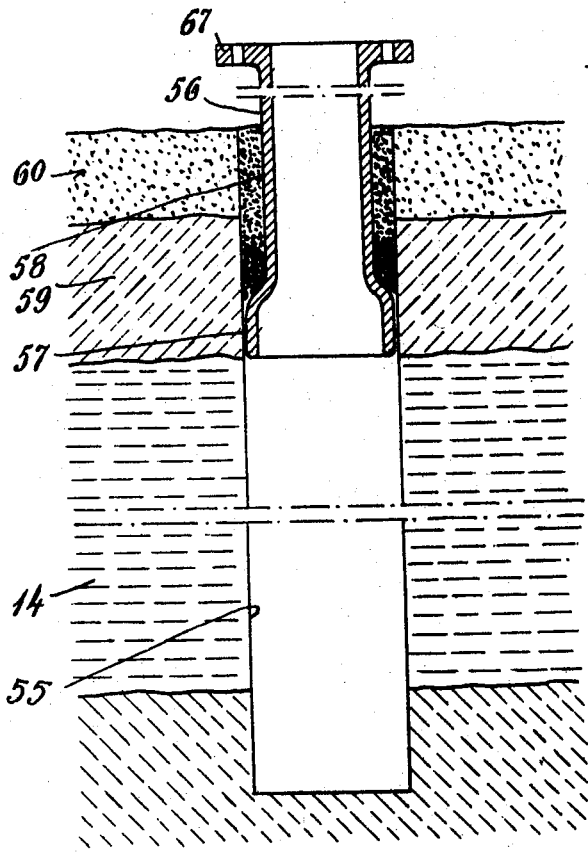
Fig. 15 is a longitudinal sectional view of a channel bored into the shales and of means for collecting and removing the volatile products from the shale.

In Fig. 15 an exhaust hole 55 for the volatile products produced in the shales is illustrated, said hole being bored vertically like the hole 15 through the shales. The hole is open except at its upper part, where it is closed by a tubular member 56 having a flange 67 for connecting it to a collecting pipe system (not shown) of well-known kind. The member 56 has a lower portion 57 fitting with rather small play in the hole 55, and an upper portion 58 having a less diameter than the portion 57. The space between the wall of the hole 55 and the upper portion 58 of the member 56 is filled with sand or quartz preferably in such manner that larger grains are placed just above the widened lower portion 57, so as together with the latter to prevent the finer grains to fall down in the hole. 59 is a layer of another kind of rock such as limestone, which may cover the shale layers 14 and in turn be covered by a layer 60 of earth.

Figure 16:
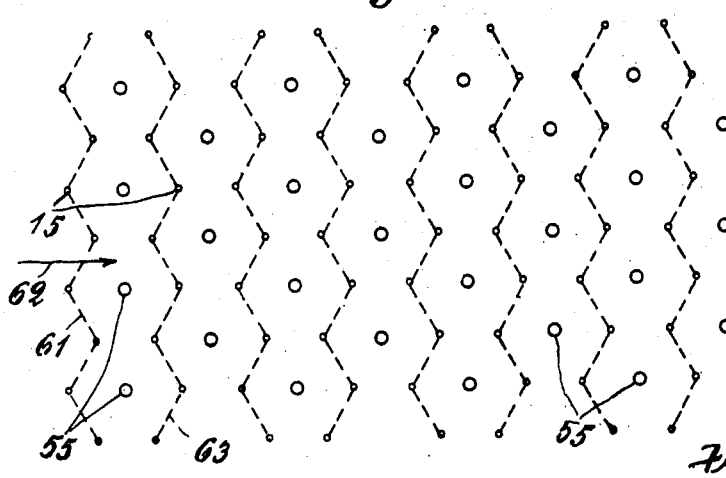
Fig. 16 is a top view of a field diagrammatically illustrating the arrangement of the various channels bored down into the shale rocks.

In Fig. 16 rows of exhaust holes 55 are provided over a field at a suitable spaced relation. The holes 15 engaging the heating elements are in this case spaced in a hexagonal fashion with a hole 55 in the center of each hexagonal. It is assumed that in the proximity of a row of holes 15 marked by the dash line 61 the heat supply has continued for such a time that the final extraction temperature is reached. In the adjacent row 63 of holes 15 tht heat supply may be started later, so that final temperature is reached at a later state. The heating elements of the subsequent rows of holes 15 are successively brought in operation consequently a wave of heat is traversing the shale in the direction of the arrow 62 in Fig. 16, the volatile products extracted from the shales being removed through the holes 55, which also are successively connected to the collecting pipe system.

The volatile products recovered by the heating process of the shale rocks are non-condensable as well as condensable. The latter include hydrocarbons from the lightest gasoline to the heaviest oil. By the fact that the heat supply channels are entirely filled according to the invention the hydrocarbons, when produced, are moved in the direction to the exhaust channels that is away from the hot heating elements. Otherwise the hydrocarbons could to a substantial extent find their way to said elements—following the smallest resistance—especially in the lowest part of the shale rock, where the blow-pressure from the rock is the highest. The invention involves the important advantage, that the hydrocarbons are in this way prevented from being decomposed in carbon and non-condensable gases, the whole resulting in that the method according to the invention gives a greater percentage of high-class gasoline products than other methods hitherto known.

Since the volatile products of the shales are extracted, the latter contain a residue of so-called shale coke. The shale may be ignited and the coke burned by supplying air into the channel system provided in the ground. A very slow combustion may in this way continue during many years, and the heat produced be used for various purposes, such as heating or preheating other shale formations, heating houses or the like, generating steam, vegetable cultivation and so on. Such cultivation may be driven just on the shales so that the heat energy stored in the shales will be utilized during several years.

While several more or less specific embodiments of the invention have been shown, it is to be understood that this is for the purpose of illustration only, and the invention is not to be limited thereby, but its scope is to be determined by the appended claims.

What I claim is:

1. A device for recovery of hydrocarbon products from a subterranean mineral deposit yielding such products upon heating, the deposit having a channel therein, a heating element in said channel located adjacent the deposit to be heated but spaced therefrom, and granular heat conducting materially substantially filling the channel between said heating element and said deposit, in which the heating element is an electrical resistance heating element in the form of a coil having a central core space for reception of a feeding member by which granular material may be supplied to the channel.

2. A device as set forth in claim 1 in which a casing member is located in the channel, and the coil is helical and connected to the casing at the lower end thereof.

3. A device for recovery of hydrocarbon products from a subterranean mineral deposit yielding such products upon heating, the deposit having a channel therein, a heating element adapted to be positioned in said channel and a feeding member associated with said heating member by which granular material may be supplied to said channel, in which the heating element has a central core and the feeding member is attached to said heating element to supply granular material to said channel through said core.

4. The device of claim 3 in which the feeding element is removably attached to said heating element.

5. In a device for recovery of hydrocarbon products from a subterranean mineral deposit yielding such products upon heating, the deposit having a channel therein, a helical heating element adapted to be positioned in said channel and a feeding member positioned within said heating element by which granular material may be supplied to said channel to surround the heating element, said feeding member being movable longitudinally with respect to said heating element as granular material supplied to said channel rises therein.

6. The device as set forth in claim 5 in which the feeding member carries a protuberance which is positioned in the space between the coils of the helical heating element whereby rotation of the feeding member will move the latter longitudinally with respect to the heating element.

7. A device for recovery of hydrocarbon products from a subterranean mineral deposit yielding such products upon heating, the deposit having a channel therein, a heating element in said channel located adjacent the deposit to be heated but spaced therefrom, and granular heat conducting material substantially filling the channel between said heating element and said deposit, wherein the deposit forming the channel is cut away to form an enlargement of the channel, and including a blow-out pipe in said enlarged portion for blowing the granular material from the channel upon conclusion of the heating operation.

8. A device for recovery of hydrocarbon products from a subterranean mineral deposit yielding such products upon heating, the deposit having a channel therein, a heating element adapted to be positioned in said channel and a feeding member associated with said heating member by which granular material may be supplied to said channel, wherein the deposit forming the channel is cut away to form an enlargement of the channel, and including a blow-out pipe in said enlarged portion for blowing the granular material from the channel upon conclusion of the heating operation.

9. A device for recovery of hydrocarbon products from a subterranean mineral deposit yielding such products upon heating, the deposit having a channel therein, a heating element in said channel located adjacent the deposit to be heated but spaced therefrom, and granular heat conducting material substantially filling the channel between said heating element and said deposit, in which the heating element is an elongated helical metallic element and is completely embedded in the granular material whereby dimensional changes of the heating element may take place in a longitudinal direction without stress destructive of the helical element.

References Cited in the file of this patent

UNITED STATES PATENTS

| | | |
|---|---|---|
| 547,979 | Whittingham | Oct. 15, 1895 |
| 581,170 | Nebel | Apr. 20, 1897 |
| 849,524 | Baker | Apr. 9, 1907 |
| 945,321 | Gardner | Jan. 4, 1910 |
| 1,457,479 | Wolcott | June 5, 1923 |
| 1,510,655 | Clark | Oct. 7, 1924 |
| 2,208,028 | Harrington | July 16, 1940 |
| 2,216,786 | Sowden | Oct. 8, 1940 |
| 2,219,544 | Erdmann et al. | Oct. 29, 1940 |
| 2,268,978 | White | Jan. 6, 1942 |
| 2,732,195 | Ljungstrom | Jan. 24, 1956 |

FOREIGN PATENTS

| | | |
|---|---|---|
| 155,732 | Great Britain | Dec. 30, 1920 |